United States Patent [19]
Fabish et al.

[11] 3,849,892
[45] Nov. 26, 1974

[54] GEAR CHECKING MACHINE

[75] Inventors: Edward Francis Fabish, Chicago; James Robert Tookey, Rolling Meadows; Richard Telman Thompson, Chicago, all of Ill.

[73] Assignee: Illinois Tool Works, Inc., Chicago, Ill.

[22] Filed: June 21, 1973

[21] Appl. No.: 372,144

[52] U.S. Cl. .................. 33/179.5 R, 33/179.5 D
[51] Int. Cl. ................. G01b 5/20, G01b 7/28
[58] Field of Search ............... 33/179.5 R, 179.5 D

[56] References Cited
UNITED STATES PATENTS

| | | | |
|---|---|---|---|
| 3,397,459 | 8/1968 | Ehrhardt et al. | 33/179.5 D |
| 3,631,603 | 1/1972 | Munro | 33/179.5 R |

Primary Examiner—Louis R. Prince
Assistant Examiner—Richard R. Stearns

[57] ABSTRACT

A gear checking machine for measurement of the involute profile and the helical lead of a gear is disclosed. An involute checking probe is mounted for horizontal movement under the control of involute stepping motor drive circuitry. A lead checking probe is mounted for vertical movement under the control of lead stepping motor drive circuitry. A gear is mounted on a supporting table which is coupled to an encoder which indicates the angular rate of rotation of the supporting table. The output pulses from the encoder are at a reduced frequency which is determined by a preset code and they are used to produce an output drive signal to either the lead stepping motor control or to the involute stepping motor control.

6 Claims, 3 Drawing Figures

GEAR CHECKING MACHINE

BACKGROUND OF THE INVENTION

This invention concerns a gear checking machine which is particularly useful in measuring helical lead and involute of gears, especially large gears those on the order of 60 inches or more in diameter. The measurement of the helical lead and of the involute both require an accurate timed relationship between a rotating axis and linearly driven test probe. Prior art involute checkers utilize a ratio bar in conjunction with a master base circle sector or disc. This type of machine had physical limitations which did not allow the measurement of large gears on the order of 40 to 60 inches, or more, in diameter. The timed relationship between a rotating axis and linear motion of the helical lead testing machines of the prior art is generally accomplished by a sine bar unit which transmits an accurate angular measurement. Machines incorporating these devices are to be seen in U.S. Pats. Nos. 2,787,060 and 2,998,657.

The present invention eliminates the ratio bar and sine bar and utilizes a large disc or base circle which is coupled to the gear support table. The large base circle is operatively attached to an encoder which accurately registers by electronic pulses the angular or rotary movement of the base disc. The input to this encoder advantageously is achieved by utilizing a very small diameter disc which is normally driven by the outer periphery of the large base disc. This large ratio between the base disc and the encoder disc provides a large range of accuracy in determining the angular movement of the disc.

Two simple discs with properly calculated diameters rotating with each other can provide a much wider range of ratio and accuracy than that obtainable by any other device.

A number of advantages are gained by this device in proportioning, manufacturing and in assembly. These are:

1. Flexibility — large ratio range can be obtained.
2. Changes can be readily made by changing diameter of mating disc.
3. Round configuration — easy to make — easy to manufacture.
4. Exact ratio can be obtained by simple regrinding of the smaller disc.
5. Positive drive can be obtained by holding the discs in contact by means of springs, adjustable pressure bar, weights, etc.

In summary, incorporation of base disc principle in conjunction with stepping motors and gear boxes, provides a wide range of proportioning at a very low cost not possible with other known methods.

It is an object of the present invention to provide a gear checking machine for measuring the involute profile of a gear in which the gear is mounted on a rotating table and a signal is derived from the table which indicates the rate of angular rotation of said table and which is used to provide a control signal that synchronizes the linear motion of the involute profile checking probe with the motion of the table.

It is another object of the present invention to provide a gear checking machine for measuring the helical lead of a gear in which the gear is mounted on a rotating table and a signal is derived from the table which indicates the angular rate of rotation of said table and which is used to provide a control signal that synchronizes the linear motion of the helical lead checking probe with the motion of the table.

It is a further object of the present invention to provide a gear checking machine for measuring lead and involute gear characteristics in which a recorder is driven a rate that is appropriate for the characteristic that is being measured.

Other objects and advantages will be apparent to those skilled in the art from the enclosure of this document.

TECHNICAL DESCRIPTION OF THE INVENTION

Figure 1:
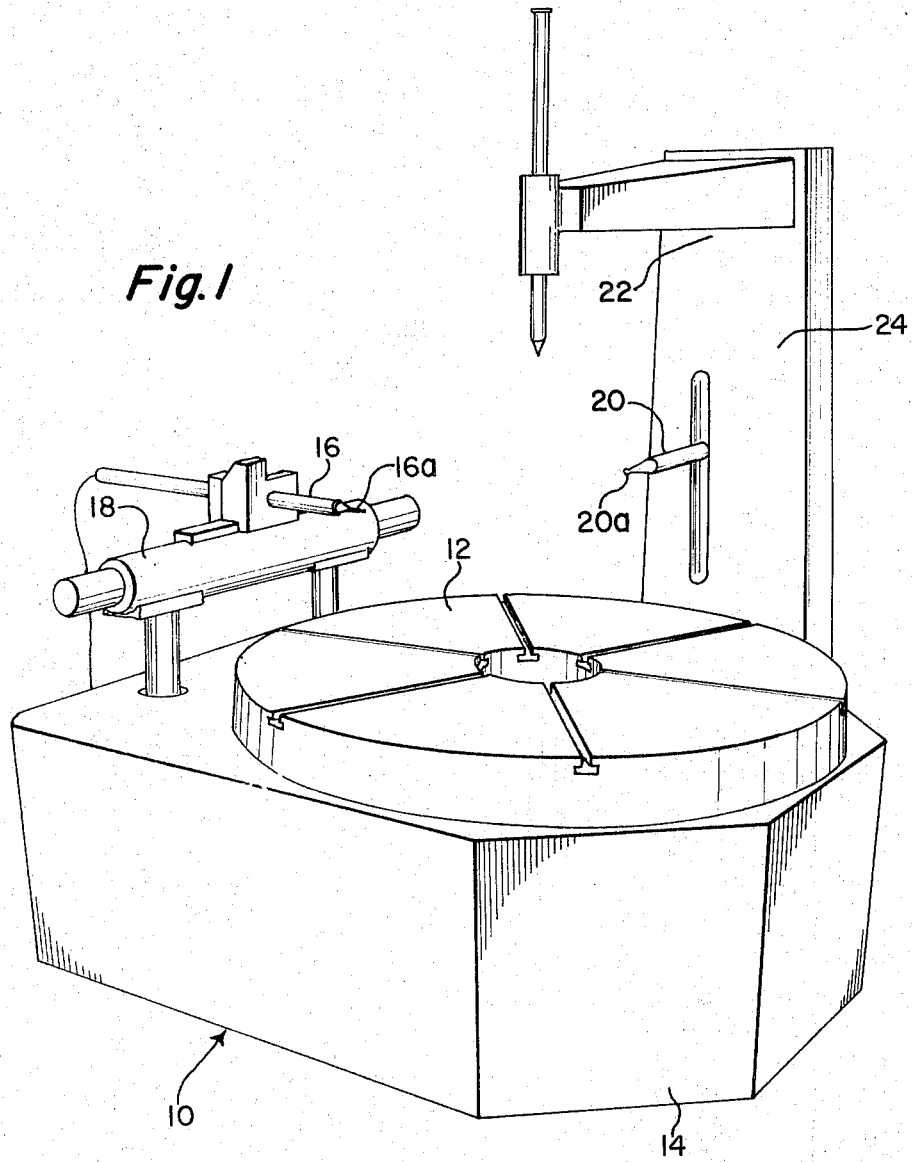
FIG. 1 is a perspective view of the gear checking machine of the present invention.

A perspective view of the gear checking machine 10 of the present invention is shown in the FIG. 1. The gear that is to be checked is placed on the large table 12 which is supported by the base 14. The table drive motor (not shown) is mounted within the base 14 to rotate the table 12 at a controlled rate. The involute measuring probe 16 is mounted for linear horizontal movement in the involute probe drive mechanism 18. The lead measuring probe 20 is mounted for linear movement in a vertical direction in the lead probe drive mechanism 22 which is supported at the top of the brace 24. The probes 16 and 20 may be pressure sensitive probes of the type generally employed in the gear checking art in which pressure applied to the sensing ends 16a, 20a, respectively, of the probes 16 and 20 control the movement of a magnetic slug in a variable differential transformer (not shown) so as to develop an electrical signal which is a function of the magnitude of the pressure on the measuring probe.

On the bottom of the support table 12 and within the base 14, a large circular base disc 26 is secured to the table so it is driven in rotation with the table 12. An encoder 28 of a conventional type has a small driven wheel 30 which is driven by the large base disc 26 so as to provide encoded signals which are representative of the angular rate of rotation of the support table 12.

In order to provide for accurate measurement of the involute and the helical lead of a gear it is necessary that the movement of the support table 12 be accurately synchronized with the linear movement of the involute probe 16 and the lead probe 20. The electrical system of the present invention which achieves the desired control is shown in block diagram in FIGS. 2 and 3.

Figures 2, 3:
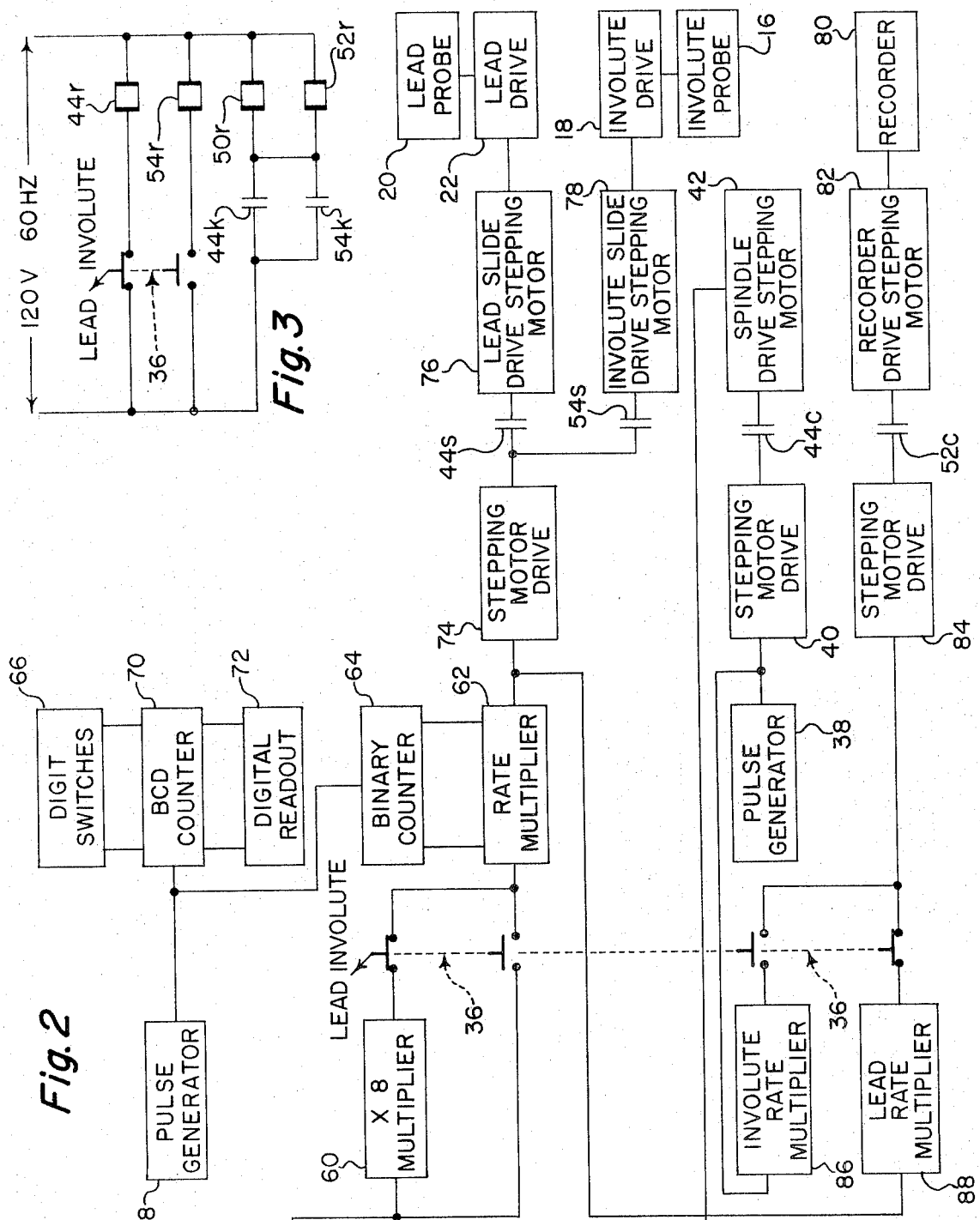
FIG. 2 is a block diagram of the control circuitry of the present invention.
FIG. 3 is a diagram of the selection switch circuitry of the present invention.

In the gear checking machine of the present invention either the helical involute or the lead may be checked at a given time. Selection of either the lead or involute measuring function is made by the multiple gang selection switch 36 which is shown in the FIGS. 2 and 3. The position of the switch 36 in FIGS. 2 and 3 is shown at the lead checking position. When the switch 36 is in the lead checking position the vertical motion of the lead probe 20 is synchronized with the rotation motion of the table 12. The driving system for the table 12 is achieved by use of a pulse generator 38 which is coupled to a stepping motor drive system 40 which supplies driving pulses to the spindle drive stepping motor 42. When the switch 36 is in the lead measuring position the relay 44r will close the contacts 44k and this will energize both the relays 50r and 52r. The relay 50r acts to close the contact 44c while the relay 52r closes the contact 52c which allows a recorder 80 to be driven at a synchronous rate, as is described subsequently in more detail. When the switch 36 is in the involute position the relay 54r is energized rather than the relay 44r. This causes the contacts 54k to close thereby again energizing both relays 50r and 52r, and, thus, again closing contacts 44c and 52c.

As the spindle drive motor 42 is stepped the table 12 rotates in incremental steps and the encoder 28 which is coupled to the base disc 26 also moves in incremental steps. The rotation of the encoder 28 provides a coded representation of the rate of angular displacement of the table 12 which consists of a series of pulses of a rate which corresponds to the rate of rotation of the table 12. This series of pulses from the encoder 28 is supplied to multiplier 60 which emits multiple output pulses for every one input pulse that it receives. The purpose of the rate multiplier 60 is to increase the speed of the lead profile probe 20. It is noted that when the switch 36 is in the involute position the rate multiplier 60 is is bypassed and the output pulse from the encoder is fed directly to the rate multiplier 62. This is because the lead measuring probe 20 must be driven at a faster rate than the involute measuring probe 16 for long leads. Aside from this factor, however, both the involute and the lead probes are controlled in substantially the same manner.

The purpose of the rate multiplier 62 is to provide a series of output pulses which occur at a predetermined fractional rate of the input pulses from the encoder 28. The rate multiplier 62 is constructed to multiply the signal from the encoder 28 by a variable preset factor rather than by a constant factor. In the checking of any given gear it is necessary to establish either manually, or by means of a recorded program, the appropriate preset factors that are to control the rate multiplier 62 for both the involute and the lead checking cycles. These factors are digital numbers which when contained in the binary counter 64, which is coupled to the rate multiplier 62, establish the appropriate frequency multiplication factor to synchronize the speed of the lead and involute probes 16, 20 with the rate of rotation of the table 12. The rate multiplier 62 is a known type of device, and one suitable type of circuit for use in the present invention is the K1848 multiplier sold by Digital Equipment Corporation of Maynard, Mass.

The manner in which the preset multiplication factor is established in the binary counter 64 can be seen by reference to the FIG. 2. The desired digital number which is needed to establish the appropriate ratio of the rate multiplier 62 may be set into the digit switches 66. The pulse generator 68 then supplies pulses to the binary coded decimal (BCD) counter 70, which is initially set to a count that is established by the digit switches 66. The BCD counter 60 counts down to zero. A digital readout 72, which is coupled to the counter 70, supplies a continuous visual indication of the contents of the counter 70. The binary counter 64 is initially at a zero count when the BCD counter is set at the count of the digit switches 66. The binary counter 64 counts up and continues counting until the count established by the digit switches 66 has been reached, at which time the count in BCD counter 70 will be zero.

With the correct multiplication factor for the rate multiplier 62 being established by the count in the counter 64 the rate multiplier 52 will supply pulses to a conventional stepping motor drive circuit 74 in accordance with the preset factor in the switches 66 thereby providing the required synchronization of the linear motion of the probes 16, 20 with the rotation of the table 12. When the switch 36 is in the lead measuring position the relay 44r is energized and the contact 44s is closed which allows the stepping motor drive circuit 74 to drive the lead slide drive stepping motor 76 and the lead drive mechanism 22 through the closed contacts 44s. On the other hand when the switch 36 is in the involute measuring position the contacts 44s are open and the contacts 54s are closed which allows the stepping motor control circuit 74 to drive the involute slide drive stepping motor 78 and the involute drive mechanism 18 through the closed contacts 54s.

In order to obtain a permanent written record of the gear being checked a recorder 80 is employed. The recorder 80 is driven by a recorder drive stepping motor 82 which is supplied pulses from the stepping motor drive circuit 84 through the contacts 52c. The recorder stepping motor drive rate is generally different according to whether the involute probe 16 is being driven or the lead probe 20 is being driven. This is achieved through the switch 36 which allows either the involute rate multiplier 86 or the lead rate multiplier 88 to be coupled to the stepping motor control system 84. The rate multipliers 86 and 88 are similar to the multiplier 60 in that they multiply the incoming pulses by a fixed ratio to provide output pulses with a frequency which is suitable for synchronizing the recorder 80 with linear motion of the probes 16, 20 and the rotational motion of the table 12.

What is claimed is:

1. A gear checking system for measuring a characteristic of a gear comprising a base member for rotatably supporting the gear, support means carried by said base member, rotating drive means for driving said support means and said gear so they rotate together, at least one means for measuring displacement including a fixed portion and a relatively movable element which engages said gear, and signal means responsive to displacements of said movable element with respect to said fixed portion so as to provide an indication of the desired characteristic of said gear as a function of said displacement, linear drive means carried by said base member for providing linear movement of said measuring means proportionally in response to pulses at the input of said linear drive means, pulse source means comprising pulse generating means the output of which is coupled to the input of said rotating drive means, encoder means coupled to said support means constructed to produce pulses in response to rotational movements of said support means, first rate factoring means also coupled to said encoder, the repetition rate of said pulses from said encoder means being proportional to the rate of rotation of said support means, the input of said first rate factoring means being coupled to receive said pulses from said encoder means as input pulses and constructed to provide a series of output pulses to the input of said linear drive means, first control means coupled to said first rate factoring means for selectively controlling the ratio of the pulse repetition rates of said input pulses to said first rate factoring means and said output pulses from said first rate factoring means, wherein said fixed portion of said measuring means is driven by said linear drive means along a linear path representing an errorless gear characteristic and said movable element and said signal means provide an indication of errors in said gear characteristic as said gear is rotatably driven, recording means having a recording medium for recording the output of said signal means which is representative of said errors in said gear characteristic, including recording drive means for driving the recording medium of said recording means comprising second rate factoring means for supplying output pulses to said recording drive means at a rate appropriate for the gear characteristic that is being measured, said second rate factoring means having its input coupled to said pulse source means so as to receive a sequence of the pulses that are developed in said pulse source means as input pulses.

2. A gear measuring system as claimed in claim 1 wherein said rotating drive means drives said support means in incremental steps, said linear drive means drives said measuring means in incremental steps and said recording drive means drives said recording means in incremental steps.

3. A gear measuring system as set forth in claim 1 in which said gear characteristic being measured is the lead of the gear, the input of said second rate factoring means is coupled to the output of said first rate factoring means so as to receive input pulses therefrom and said measuring means moves in a direction substantially parallel to the axis of said gear during said measurement.

4. A gear measuring system as claimed in claim 3 wherein said rotating drive means drives said support means in incremental steps, said linear drive means drives said measuring means in incremental steps and said recording drive means drives said recording means in incremental steps.

5. A gear measuring system as set forth in claim 1 in which said gear characteristic being measured is the helical involute of the gear, the input of said second rate factoring means is coupled to the output of said pulse generating means so as to receive input pulses therefrom and said measuring means moves in a direction substantially normal to the axis of said gear during said measurement.

6. A gear measuring system as claimed in claim 5 wherein said rotating drive means drives said support means in incremental steps, said linear drive means drives said measuring means in incremental steps and said recording drive means drives said recording means in incremental steps.

* * * * *